(12) United States Patent
Narel et al.

(10) Patent No.: US 8,332,078 B2
(45) Date of Patent: Dec. 11, 2012

(54) SYSTEM, CHARGING DEVICE, AND METHOD OF SUPPLYING CURRENT TO A POWER STORAGE DEVICE

(75) Inventors: Radoslaw Narel, Kensington, CT (US); Cecil Rivers, Jr., West Hartford, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/278,222

(22) Filed: Oct. 21, 2011

(65) Prior Publication Data

US 2012/0041613 A1   Feb. 16, 2012

(51) Int. Cl.
G05F 5/00 (2006.01)
(52) U.S. Cl. ........................................ 700/297; 320/109
(58) Field of Classification Search ............ 700/22, 700/297; 320/109
See application file for complete search history.

(56) References Cited

U.S. PATENT DOCUMENTS

| 5,684,379 | A | 11/1997 | Svedoff |
| 7,135,956 | B2 | 11/2006 | Bartone et al. |
| 7,679,336 | B2 * | 3/2010 | Gale et al. ............... 320/155 |
| 7,693,609 | B2 * | 4/2010 | Kressner et al. ........... 700/291 |
| 2010/0066170 | A1 | 3/2010 | Schuler |
| 2010/0114387 | A1 | 5/2010 | Chassin |
| 2010/0134067 | A1 * | 6/2010 | Baxter et al. ............. 320/109 |
| 2010/0141204 | A1 | 6/2010 | Tyler et al. |
| 2010/0274656 | A1 | 10/2010 | Genschel et al. |
| 2011/0043165 | A1 | 2/2011 | Kinser et al. |
| 2011/0074350 | A1 * | 3/2011 | Kocher ................... 320/109 |
| 2011/0133693 | A1 * | 6/2011 | Lowenthal et al. ......... 320/109 |
| 2011/0144823 | A1 * | 6/2011 | Muller et al. ............. 700/297 |

FOREIGN PATENT DOCUMENTS

WO   2010120551   10/2010

* cited by examiner

*Primary Examiner* — Ryan Jarrett
(74) *Attorney, Agent, or Firm* — Global Patent Operation; Stephen G. Midgley (57) ABSTRACT

A system for use in supplying current from an electric power source to a plurality of power storage devices includes a first of a plurality of charging devices configured to supply current to a first of the plurality of power storage devices. The system also includes at least one other charging device coupled to the first charging device to form a network. The other charging device is configured to supply current to at least one other power storage device. The first charging device includes a processor programmed to determine an amount of current to be at least one of received from the electric power source and supplied to the first power storage device as a function of a number of charging devices, and enable the amount of current to be at least one of received by the first charging device and supplied to the first power storage device.

18 Claims, 4 Drawing Sheets

SYSTEM, CHARGING DEVICE, AND METHOD OF SUPPLYING CURRENT TO A POWER STORAGE DEVICE

BACKGROUND OF THE INVENTION

The present application relates generally to charging devices and, more particularly, to a system, a charging device, and a method of supplying current to a power storage device.

As electric vehicles and/or hybrid electric vehicles have gained popularity, an associated need to manage delivery of electrical energy to such vehicles has increased. In addition, a need to provide safe and efficient charging devices or stations has been created by the increased use of such vehicles.

At least some known charging stations include a power cable or other conductor that may be removably coupled to the electric vehicle. The charging stations receive electricity from an electric utility distribution network or another electricity source, and deliver electricity to the electric vehicle through the power cable.

In at least some electric utility distribution networks, a plurality of charging devices receive electricity from a common electrical distribution component, such as a transformer. However, if each charging device operates concurrently to supply charging current to an electric vehicle, the current supplied to the electrical distribution component may exceed a rated current limit of the component. In such situations, the electrical distribution component may be damaged and/or a circuit breaker or another protection device may activate to disable power to all charging devices coupled to the electrical distribution component.

BRIEF DESCRIPTION OF THE INVENTION

In one embodiment, a system for use in supplying current from an electric power source to a plurality of power storage devices is provided that includes a first charging device of a plurality of charging devices configured to supply current to a first power storage device of the plurality of power storage devices. The system also includes at least one other charging device of the plurality of charging devices coupled to the first charging device to form a network. The at least one other charging device is configured to supply current to at least one other power storage device of the plurality of power storage devices. The first charging device includes a processor programmed to determine an amount of current to be at least one of received from the electric power source and supplied to the first power storage device as a function of a number of the plurality of charging devices, and enable the determined amount of current to be at least one of received by the first charging device and supplied to the first power storage device.

In another embodiment, a charging device is provided that includes a current control device configured to selectively enable current to be received from an electric power source and supplied to a power storage device and a network interface configured to couple to at least one other charging device to form a network. The charging device also includes a processor coupled to the current control device and programmed to determine an amount of current to be at least one of received from the electric power source and supplied to the power storage device as a function of a number of charging devices within the network, and control the current control device to enable the amount of current to be at least one of received from the electric power source and supplied to the power storage device.

In yet another embodiment, a method of supplying current to a power storage device is provided that includes determining a number of a plurality of charging devices within a network, wherein a first charging device of the plurality of charging devices includes a current control device configured to receive current from an electric power source and to supply current to the power storage device. The method also includes determining an amount of current to be at least one of received from the electric power source and supplied to the power storage device by the first charging device as a function of the number of charging devices within the network, and controlling the current control device to enable the amount of current to be at least one of received from the electric power source and supplied to the power storage device.

DETAILED DESCRIPTION OF THE INVENTION

In some embodiments, the term "electric vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. A hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
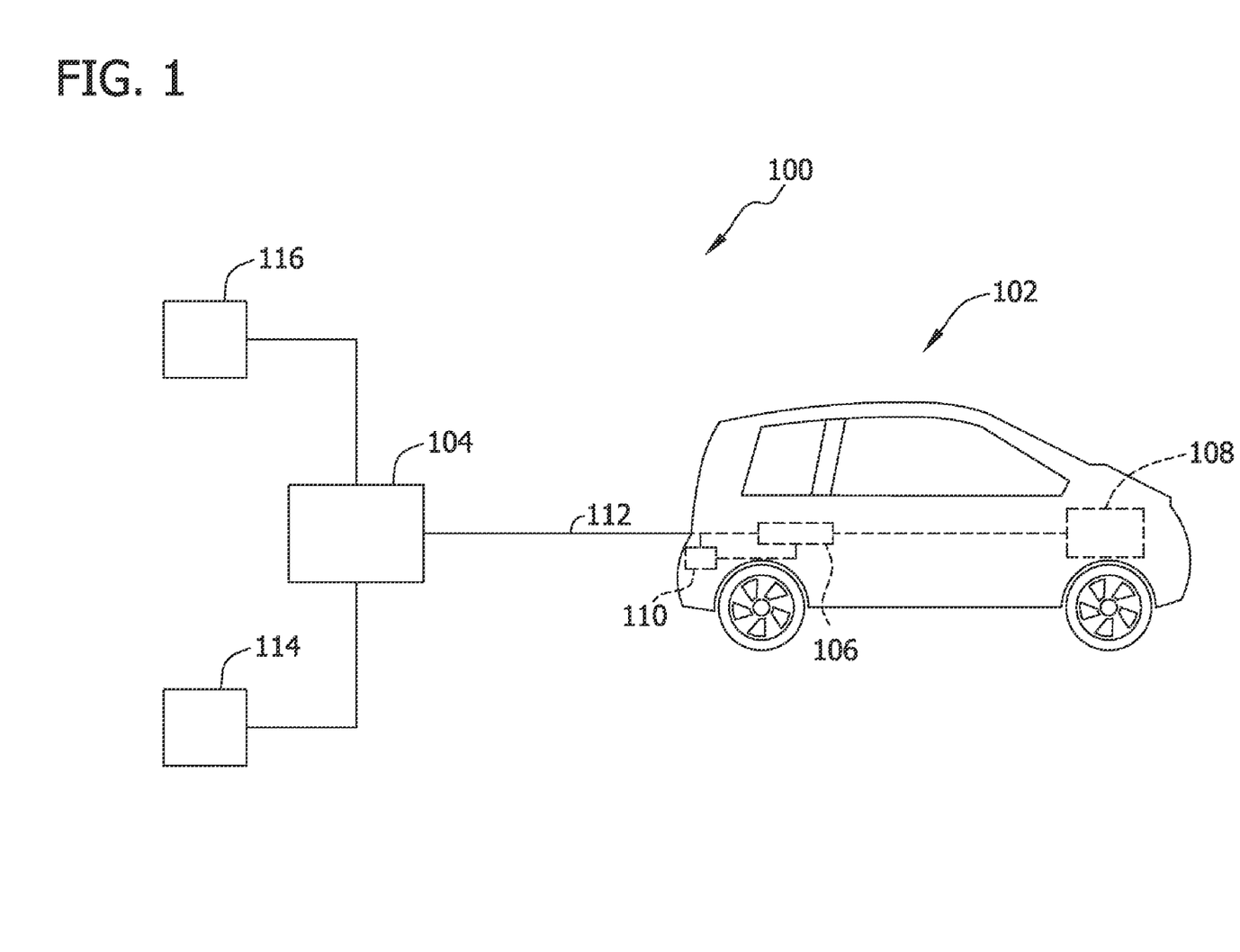
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. Electric vehicle 102 includes at least one power storage device 106, such as a battery and/or any other storage device, coupled to a motor 108. In an exemplary embodiment, electric vehicle 102 also includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown) and/or by inductive coupling such that no conduit 112 is used. In an exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any number of conductors that enables system 100 to function as described herein. In an exemplary embodiment, charging device 104 is coupled to an electric power source 114, such as a power grid of an electric utility company, a generator, a battery, and/or any other device or system that provides electricity to charging device 104.

In an exemplary embodiment, charging device 104 is coupled to at least one server 116 through a network, such as the Internet, a local area network (LAN), a wide area network (WAN), and/or any other network or data connection that enables charging device 104 to function as described herein. Server 116, in an exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

In an exemplary embodiment, server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, in an exemplary embodiment, a user couples power storage device 106 to charging device 104 with power conduit 112. The user may access a user interface device (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112. Charging device 104 communicates with vehicle controller 110 wirelessly, through power conduit 112, and/or through any other conduit, to control and/or to monitor the delivery of power to power storage device 106. For example, vehicle controller 110 transmits signals to charging device 104 indicating a charge level of power storage device 106 and/or a desired amount and/or rate of power to be provided by charging device 104. In addition, charging device 104 transmits signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
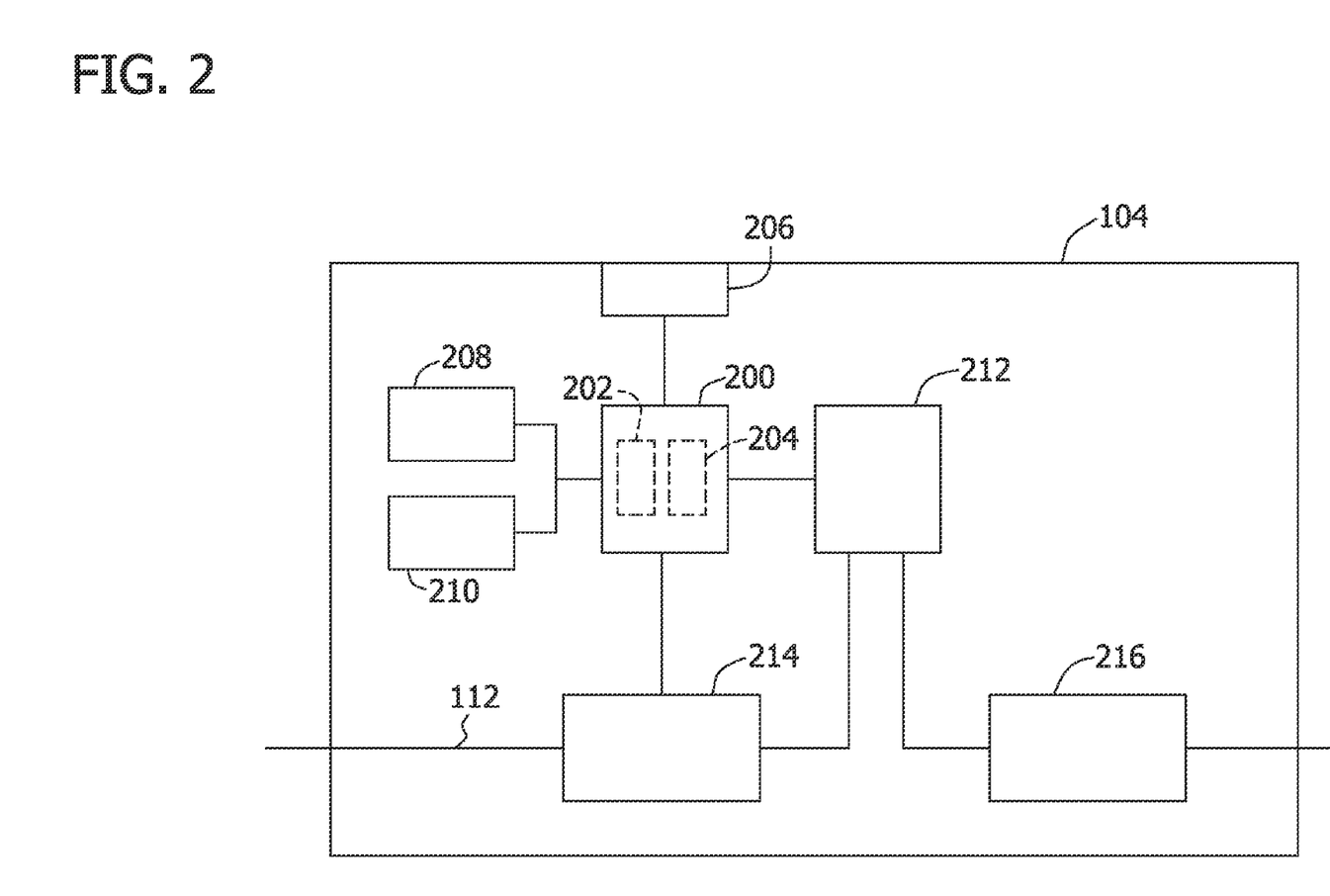
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user interface device 210, to a meter 212, and to a current control device 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 204 includes a computer readable medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system. In an exemplary embodiment, network interface 206 is communicatively coupled to at least one other charging device 104 such that charging devices 104 transmit and receive data to and from each other. In an exemplary embodiment, network interface 206 is coupled to a network interface 206 of at least one other charging device 104 using any suitable data conduit, such as an Ethernet cable, a Recommended Standard (RS) 485 compliant cable, and/or any other data conduit that enables charging device 104 to function as described herein. Alternatively, network interface 206 communicates wirelessly with a network interface 206 of at least one other charging device 104 using any suitable wireless protocol.

In an exemplary embodiment, display 208 includes a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In an exemplary embodiment, a charging status of power storage device 106 (shown in FIG. 1), payment information, user authentication information, and/or any other information may be displayed to a user on display 208.

User interface device 210 includes, without limitation, a keyboard, a keypad, a touch-sensitive screen, a scroll wheel, a pointing device, a barcode reader, a magnetic card reader, a radio frequency identification (RFID) card reader, a contactless credit card reader, a near field communication (NFC) device reader, an audio input device employing speech-recognition software, and/or any suitable device that enables a user to input data into charging device 104 and/or to retrieve data from charging device 104. In an exemplary embodiment, the user may operate user interface device 210 to initiate and/or terminate the delivery of power to power storage device 106. In one embodiment, the user may input user authentication information and/or payment information using user interface device 210.

In an exemplary embodiment, current control device 214 is coupled to power conduit 112 and to meter 212. In an exemplary embodiment, current control device 214 is a contactor 214 coupled to, and controlled by, controller 200. In an exemplary embodiment, controller 200 operates, or opens contactor 214 to interrupt the current flowing through power conduit 112 such that power storage device 106 is electrically disconnected from electric power source 114 (shown in FIG. 1). Controller 200 closes contactor 214 to enable current to flow through power conduit 112 such that power storage device 106 is electrically connected to electric power source 114.

Meter 212 is coupled to power conduit 112 and to controller 200 for use in measuring and/or calculating the current, voltage, and/or power provided from electric power source 114 to power storage device 106. Meter 212 transmits data representative of the measured current, voltage, and/or power to controller 200.

In an exemplary embodiment, a current protection device 216 is coupled to meter 212 and to electric power source 114. Current protection device 216 electrically isolates or disconnects charging device 104 from electric power source 114 if the current received from electric power source 114 exceeds a predetermined threshold or current limit. In an exemplary embodiment, current protection device 216 is a circuit breaker. Alternatively, current protection device 216 may be a fuse, a relay, and/or any other device that enables current protection device 216 to function as described herein.

During operation, power storage device 106 of electric vehicle 102 is coupled to charging device 104 using power conduit 112. In one embodiment, a user obtains authorization from server 116 and/or another system or device to enable charging device 104 to charge (i.e., to provide electrical current to) power storage device 106. As described more fully herein, charging device 104 determines an amount of current to provide to power storage device 106 as a function of a number of charging devices 104 within a network and based on a current distribution limit of an electrical distribution device (neither shown in FIG. 2) that charging devices 104 are coupled to.

Figure 3:
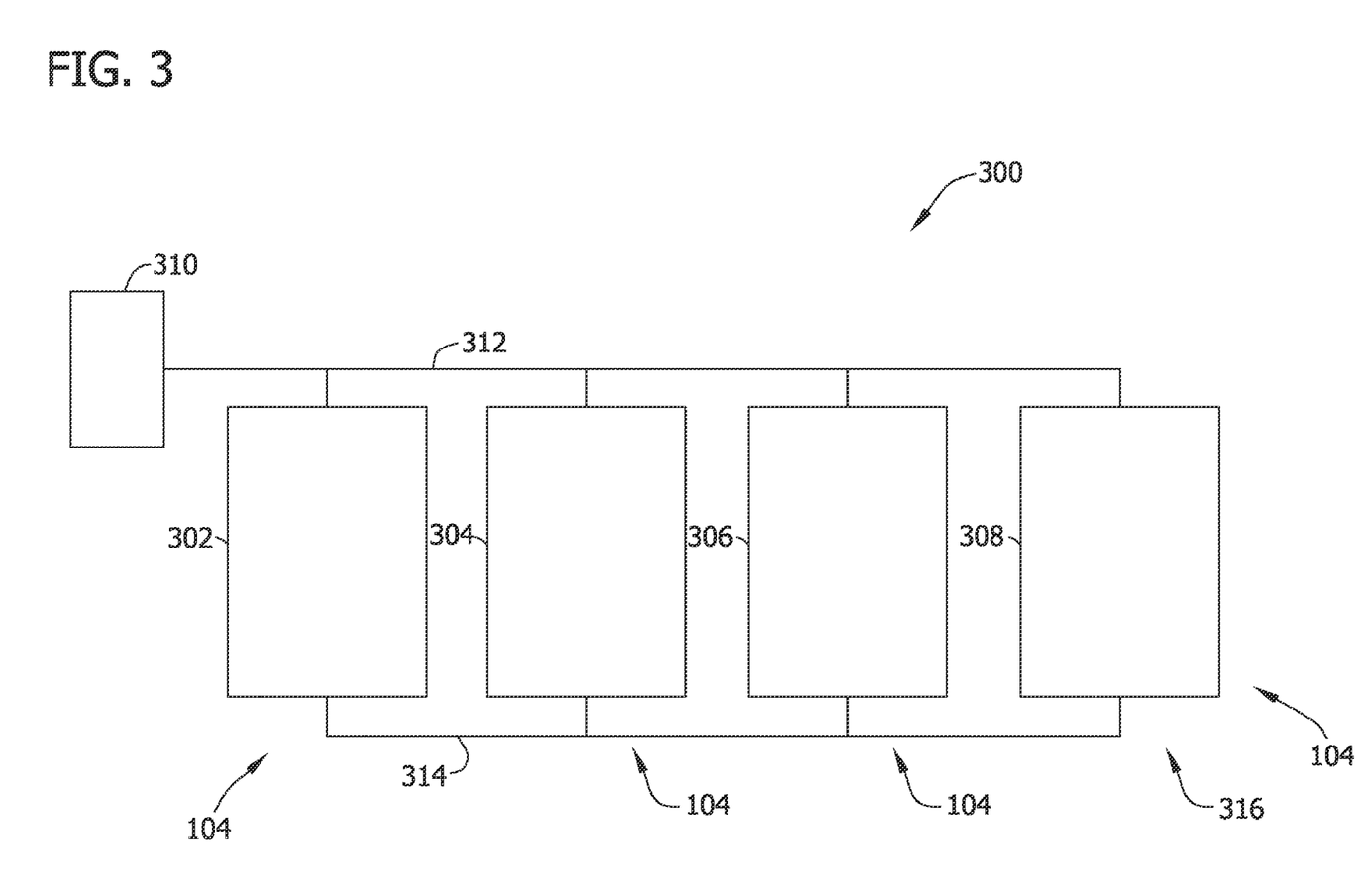
FIG. 3 is a block diagram of an exemplary charging system for charging a plurality of electric vehicles that may be used with the system shown in FIG. 1.

FIG. 3 is a block diagram of an exemplary charging system 300 that may be used to charge a plurality of electric vehicles 102, such as by charging a power storage device 106 (both shown in FIG. 2) of each electric vehicle 102. In an exemplary embodiment, charging system 300 includes a plurality of charging devices 104, such as a first charging device 302, a second charging device 304, a third charging device 306, and a fourth charging device 308. While FIG. 3 illustrates four charging devices 104, charging system 300 may include any number of charging devices 104 as desired.

In an exemplary embodiment, charging devices 104 are coupled to a common electrical distribution device 310 through respective power conduits 312. In an exemplary embodiment, electrical distribution device 310 is a transformer 310 that adjusts a distribution voltage received from electric power source 114 to a voltage suitable for use with charging devices 104. Alternatively, electrical distribution device 310 may be any other device that enables charging system 300 to function as described herein. In an exemplary embodiment, electrical distribution device 310 distributes current to each charging device 104 until the distributed current reaches a current distribution limit of electrical distribution device 310. For example, electrical distribution device 310 may be designed or "rated" to distribute a predefined amount of current. Accordingly, the current distribution limit may be set to the predefined amount of current or a current level below the predefined amount. As described more fully herein, each charging device 104 determines an amount of current to draw (or receive) from electrical distribution device 310 and/or to supply to power storage devices 106 as a function of the current distribution limit, the amount of current drawn from other charging devices 104, and/or the number of charging devices 104 within a network. For example, the amount of current received from electric power source 114 may be different than the amount of current supplied to a power storage device 106 coupled to a charging device 104 as a result of current consumption within charging device 104 and/or current consumption by one or more loads, other than power storage devices 106, coupled to charging device 104. Alternatively, charging devices 104 are coupled to a plurality of electrical distribution devices 310 and each charging device 104 determines the amount of current to draw from one or more electrical distribution devices 310 and/or supply to power storage devices 106 as a function of the current distribution limits of electrical distribution devices 310, the amount of current drawn from and/or supplied by other charging devices 104, and/or the number of charging devices 104 within one or more networks.

Charging devices 104, in an exemplary embodiment, are coupled together in data communication by a data bus 314. More specifically, charging devices 104 are coupled to data bus 314 by respective network interfaces 206 (shown in FIG. 2). In an exemplary embodiment, data bus 314 includes at least one data conduit (not shown), such as an Ethernet cable, a Recommended Standard (RS) 485 compliant cable, and/or any other data conduit that enables data bus 314 to function as described herein. Alternatively, charging devices 104 are coupled together in data communication by a wireless network. In an exemplary embodiment, charging devices 104 and/or data bus 314 form a peer-to-peer network 316 that enables each charging device 104 to exchange data with other charging devices 104 coupled to network 316 without requiring a master controller. Alternatively, charging devices 104 and/or data bus 314 may form any other network that enables charging system 300 to function as described herein.

As described more fully herein, in an exemplary embodiment, each charging device 104 transmits at least one request to each other charging device 104 to receive data regarding the current usage and/or expected current usage of each other charging device 104. As used herein, the term "current usage" refers to an amount of current supplied and/or expected to be supplied by a charging device 104 to a power storage device 106 and/or an amount of current received and/or expected to be received by charging device 104 from electric power source 114. Alternatively, each charging device may receive current usage data from another source, such as from a remote computer (not shown), from a subset of charging devices 104 coupled to network 316, and/or from any other source that enables charging system 300 to function as described herein.

Figure 4:
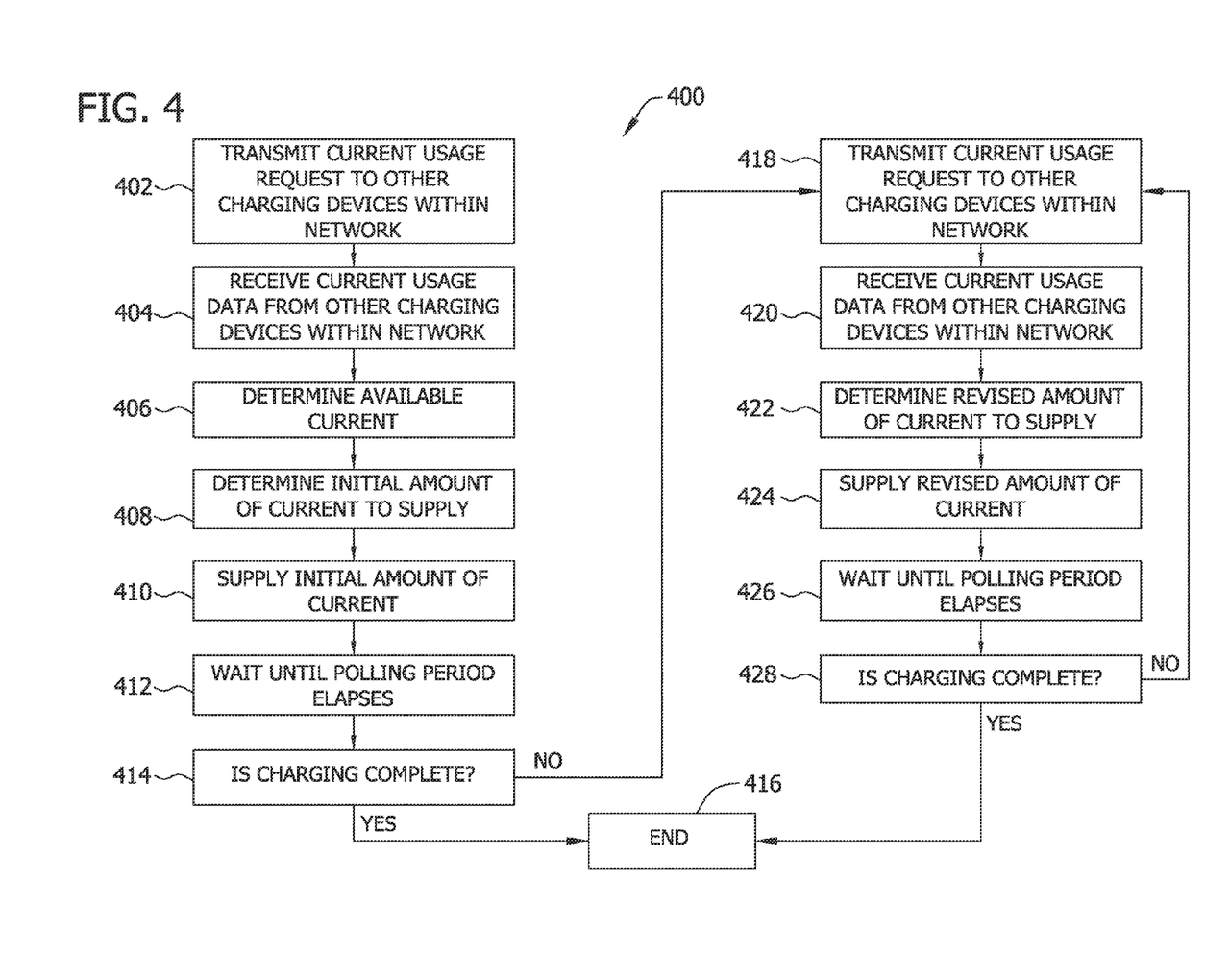
FIG. 4 is a flow diagram of an exemplary method of supplying current to a power storage device that may be used with the charging device shown in FIG. 2.

FIG. 4 is a flow diagram of an exemplary method 400 for supplying current to a power storage device, such as power storage device 106, that may be used with charging device 104 (both shown in FIG. 1). In an exemplary embodiment, method 400 is embodied within a plurality of instructions stored within memory device 204, and is at least partially executed by processor 202 (both shown in FIG. 2).

In an exemplary embodiment, a charging device 104, such as first charging device 302 (shown in FIG. 3), that is requested (e.g., by vehicle controller 110) to supply current to a power storage device 106 coupled thereto transmits 402 a request for current usage data (hereinafter referred to as a "current usage request") to at least one other charging device 104 within a network, such as network 316 (shown in FIG. 3). Specifically, in an exemplary embodiment, first charging device 302 transmits 402 a current usage request to each other charging device 104 within network 316 (such as second charging device 304, third charging device 306, and/or fourth charging device 308). In an exemplary embodiment, the current usage request notifies other charging devices 104 within network 316 that first charging device 302 expects to begin or continue charging power storage device 106.

Each charging device 104 that receives the current usage request from first charging device 302 responds by transmitting current usage data to first charging device 302. The current usage data includes data representative of an amount of current being supplied to a power storage device 106 and/or an expected amount of current that the charging device 104 receiving the current usage request anticipates supplying to a power storage device 106. The current usage data may also or alternatively include data representative of an amount of current received from electrical distribution device 310 and/or electric power source 114 (through electrical distribution device 310), and/or an amount of current expected to be received from electrical distribution device 310 and/or electric power source 114 (through electrical distribution device 310). First charging device 302 receives 404 current usage data from each other charging device 104 within network 316.

If first charging device 302 does not receive 404 a response (i.e., current usage data) from a charging device 104 within network 316 within a predetermined time period (hereinafter referred to as a "response period"), first charging device 302 sets a value (hereinafter referred to as a "non-responsive current value") for the current supplied, received, expected to be received, and/or expected to be supplied by the non-responsive charging device 104 to a predetermined maximum current supply value. In one embodiment, the maximum current supply value is about 30 amperes. Alternatively, the maximum current supply value is any other value that enables method 400 to operate as described herein.

First charging device 302 determines 406 an amount of current available (hereinafter the "available current") to be supplied through or by electrical distribution device 310. In an exemplary embodiment, the available current is equal to the current distribution limit of electrical distribution device 310 minus a sum of the current supplied, received, expected to be received, and/or expected to be supplied by each charging device 104 (other than first charging device 302) within network 316. For example, if the current distribution limit of electrical distribution device 310 is about 100 amperes, and three charging devices 104 (other than the requesting first charging device 302) are each supplying about 30 amperes of current to a respective power storage device 106 or are receiving about 30 amperes of current from electrical distribution device 310 for supplying to a respective power storage device 106, the available current is determined 406 to be about 10 amperes. In an exemplary embodiment, the non-responsive current values are also subtracted from the current distribution limit such that the available current is reduced by the non-responsive current values.

In an exemplary embodiment, first charging device 302 determines 408 an initial amount of current (hereinafter the "initial current") to receive from electric power source 114 and/or to supply to power storage device 106 based on the available current. If the available current is greater than or equal to a minimum current charging level, first charging device 302 determines 408 the initial amount of current to be equal to the available current. In an exemplary embodiment, the minimum current charging level is a predetermined minimum current level that power storage device 106 is designed to receive from first charging device 302 and/or that first charging device 302 is designed to supply to power storage device 106. In one embodiment, the minimum current charging level is about six amperes (A). Alternatively, the minimum current charging level may be any other value that enables method 400 to function as described herein. If, however, the available current is less than the minimum current charging level, first charging device 302 does not supply current to power storage device 106 until the available current increases to, or above, the minimum current charging level.

In an exemplary embodiment, first charging device 302 supplies 410 the initial amount of current to power storage device 106 and/or receives the initial amount of current from electric power source 114. Specifically, processor 202 controls or closes current control device 214 to receive current from electric power source 114 and supply 410 current to power storage device 106. First charging device 302 waits 412 until a polling period elapses. The polling period represents a time between current usage requests sent by first charging device 302 such that first charging device 302 transmits 402 a first current usage request before or at a beginning of the polling period and transmits 402 a second current usage request at an end of the polling period or after the polling period elapses. In one embodiment, the polling period is about 10 seconds. Alternatively, the polling period may be any other amount of time that enables method 400 to operate as described herein.

After the polling period elapses, first charging device 302 determines 414 whether the charging of power storage device 106 has completed (i.e., whether power storage device 106 has been charged to a desired level). If the charging has completed, method 400 ends 416 and power storage device 106 may be decoupled from first charging device 302. Method 400 commences or resumes when another power storage device 106 is coupled to first charging device 302 and/or when first charging device 302 receives a request to begin charging a power storage device 106.

If the charging of power storage device 106 has not completed, first charging device 302 transmits 418 a current usage request to at least one other charging device 104 within network 316. Specifically, in an exemplary embodiment, first charging device 302 transmits 418 a current usage request to each other charging device 104 within network 316 (such as second charging device 304, third charging device 306, and/or fourth charging device 308).

Each charging device 104 that receives the current usage request from first charging device 302 responds by transmitting current usage data to first charging device 302, as described above. First charging device 302 receives 420 current usage data from each other charging device 104 within network 316.

In an exemplary embodiment, first charging device 302 determines 422 a revised amount of current to receive from electric power source 114 and/or to supply to power storage device 106. First charging device 302 subtracts the non-responsive current values from the current distribution limit of electrical distribution device 310, as described above, to calculate a reduced current distribution limit. The revised amount of current is determined 422 by dividing the reduced current distribution limit by a number of charging devices 104 (including first charging device 302) within network 316. For example, if the current distribution limit (or reduced current distribution limit) of electrical distribution device 310 is about 100 amperes and four charging devices 104 (including first charging device 302) are supplying current to one or more power storage devices 106 and/or receiving current from electric power source 114, first charging device 302 determines 422 the revised amount of current to be about 25 amperes. If the revised amount of current is greater than the available current (i.e., the current distribution limit minus the sum of the current supplied, received, expected to be received, and/or expected to be supplied by each other charging device 104), first charging device 302 reduces the revised amount of current to the available current.

In an exemplary embodiment, the number of charging devices 104 within network 316 is determined to be the number of charging devices 104 that are supplying current to a power storage device 106, receiving current from electric power source 114, expecting to receive current from electric power source 114, and/or expecting to supply current to a power storage device 106. The number of charging devices 104 is determined by a discovery process, e.g., based on the responses to the current usage request that are received 420 from other charging devices 104. Alternatively, the number of charging devices 104 is determined by accessing or receiving data from a predefined list or other data structure stored in a memory, such as memory device 204. The data (i.e., the number of charging devices 104 within network 316) may be created and/or stored in memory device 204 as part of a configuration or system startup process, may be entered by a user, for example, through user interface device 210, and/or may be received by another system or device, for example, through network interface 206.

First charging device 302 supplies 424 the revised amount of current to power storage device 106 and/or receives the revised amount of current from electric power source 114, for example, by controlling or closing current control device 214. First charging device 302 waits 426 until the polling period elapses, as described above. After the polling period elapses, first charging device 302 determines 428 whether the charging of power storage device 106 has completed (i.e., whether power storage device 106 has been charged to a desired level). If the charging has not completed, first charging device 302 transmits 418 another current usage request to at least one other charging device 104 within network 316, as described above.

If the charging of power storage device 106 has completed, method 400 ends 416 and power storage device 106 may be decoupled from charging device 104. Method 400 commences when another power storage device 106 is coupled to first charging device 302 and/or when first charging device 302 receives a request to begin charging a power storage device 106.

In an exemplary embodiment, each charging device 104 within network 316 executes method 400 to determine the amount of current to supply to one or more power storage devices 106 coupled to each charging device 104 and/or to receive from electric power source 114 (e.g., for use in supplying current to power storage devices 106). Through the determination 422 of the revised amount of current, method 400 substantially equalizes or balances the amount of current supplied to power storage devices 106 and/or received from electric power source 114 by each charging device 104. As such, the current distribution limit of electrical distribution device 310 is not exceeded and each charging device 104 is adjusted to supply and/or receive a substantially equal amount of current as compared to other charging devices 104 within network 316.

During execution of method 400, two or more charging devices 104 may undesirably transmit current usage requests to each other and/or to other charging devices 104 within network 316 at substantially the same time or during a period when a charging device 104 is waiting to receive 420 current supply data from other charging devices 104 (i.e., during the response period). In such a situation, an "interference" of current usage requests may occur. For example, first charging device 302 transmits a current usage request to charging devices 104 within network 316 to determine the amount of current each charging device 104 is supplying, receiving, expecting to receive, or is expecting to supply. While waiting for the current usage data to be received 420 in response to the current usage request (i.e., during the response period), first charging device 302 receives a current usage request from second charging device 304. In such a situation, first charging device 302 detects an interference of current usage requests.

When an interference of current usage requests occurs, a charging device 104 that detects the interference (e.g., first charging device 302 in the example above) transmits an interference message to all other charging devices 104 within network 316. The interference message instructs each charging device 104 to wait for a delay time to elapse before transmitting a new current usage request and/or before re-transmitting a current usage request that interfered with a current usage request from another charging device 104. In an exemplary embodiment, the delay time is a random number selected between a lower delay value and an upper delay value. The number selected represents a number of seconds, milliseconds, tens of milliseconds, or any other unit of time that enables method 400 to operate as described herein. In an exemplary embodiment, the lower delay value is about zero and the upper delay value is about equal to a value selected from a sequence of delay values, such as a Fibonacci sequence or any other sequence. In an exemplary embodiment, the upper delay value is initially set to a first non-zero value of a Fibonacci sequence (i.e., a value of 1). As a charging device 104 detects additional interferences, the upper delay value is set to subsequent values of the Fibonacci sequence (e.g., to a value of 1 for the second interference detected, a value of 2 for the third interference detected, a value of 3 for the fourth interference detected, etc.). Alternatively, the lower delay value, the upper delay value, and/or the delay time is any other value or time that enables method 400 to operate as described herein.

After the delay time elapses, first charging device 302 re-transmits the current usage request to other charging devices 104 within network 316. If first charging device 104 does not detect an interference after re-transmitting the current usage request (and does not receive an interference message from another charging device 104), first charging device 104 resumes transmitting current usage requests at the end of each polling period and resets the upper delay value to the first number of the delay sequence. In a similar manner, other charging devices 104 that detected an interference re-transmit current usage requests after a respective random delay time has elapsed. If no subsequent interference is detected, other charging devices 104 resume transmitting current usage requests at the end of each respective polling period and reset the upper delay value to the first number of the delay sequence. As such, the increasing, randomized delay times facilitate reducing a probability of experiencing subsequent interferences.

As described herein, a robust and effective charging device is provided. The charging device includes a processor configured to selectively activate a current control device to receive current from an electric power source and to supply current to a power storage device of an electric vehicle. The charging device is coupled to at least one other charging device within a peer-to-peer network, and each charging device within the network is configured to receive current from a common electrical distribution device. The charging device determines a total number of charging devices within the network that are supplying current and/or expecting to supply current to a power storage device, and/or receiving current and/or expecting to receive current from the electric power source. The number of charging devices is determined by a discovery process or by accessing data stored in a memory device. Each charging device within the network receives current from the electric power source and/or supplies current to a power storage device in an amount equal to a current distribution limit of the electrical distribution device divided by the number of charging devices supplying and/or expecting to supply current to a power storage device, and/or receiving and/or expecting to receive current from the electric power source. Accordingly, the current received and/or supplied by each charging device is substantially balanced or equalized and the charging devices are prevented from exceeding the current distribution limit of the electrical distribution device.

A technical effect of the systems, devices, and methods described herein includes at least one of (a) determining a number of a plurality of charging devices within a network, wherein a first charging device of the plurality of charging devices includes a current control device configured to at least one of receive current from an electric power source and supply current to a power storage device; (b) determining an amount of current to be at least one of received from an electric power source and supplied to a power storage device by a first charging device as a function of a number of charging devices within a network; and (c) controlling a current control device to enable an amount of current to be at least one of received from an electric power source and supplied to a power storage device.

Exemplary embodiments of a system, a charging device, and a method of supplying current to a power storage device are described above in detail. The system, charging device, and method are not limited to the specific embodiments described herein, but rather, components of the system and/or charging device and/or steps of the method may be utilized independently and separately from other components and/or steps described herein. For example, the charging device may also be used in combination with other power systems and methods, and is not limited to practice with only the electric vehicle as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in supplying current from an electric power source to a plurality of power storage devices, said system comprising:
   a first charging device of a plurality of charging devices configured to supply current to a first power storage device of the plurality of power storage devices; and
   a second charging device of said plurality of charging devices coupled to said first charging device to form a network, said second charging device configured to supply current to a second power storage device of the plurality of power storage devices;
   said first charging device comprising a first processor programmed to:
      determine an amount of current to be at least one of received from the electric power source and supplied to the first power storage device as a function of a number of said plurality of charging devices, and
      enable the determined amount of current to be at least one of received by said first charging device and supplied to the first power storage device;
   said second charging device comprising a second processor programmed to:
      determine an amount of current to be at least one of received from the electric power source and supplied to the second power storage device as a function of the number of said plurality of charging devices, and
      enable the determined amount of current to be at least one of received by said second charging device and supplied to the second power storage device;
   wherein said first processor is further programmed to transmit a first request to said second charging device to determine an amount of current that said second charging device is at least one of supplying, receiving, expecting to receive, and expecting to supply; and
   wherein said second processor of said second charging device is further programmed to transmit a second request to said first charging device, and wherein said first processor of said first charging device is further programmed to detect an interference that occurs when said first charging device receives the second request while waiting for data to be received in response to the first request.

2. A system in accordance with claim 1, wherein the first power storage device is a power storage device of an electric vehicle.

3. A system in accordance with claim 1, wherein each charging device of said plurality of charging devices is coupled to an electrical distribution device and is configured to receive current from the electrical distribution device.

4. A system in accordance with claim 3, wherein said first processor is programmed to determine the amount of current to be at least one of received from the electric power source and supplied to the first power storage device by dividing a current distribution limit of the electrical distribution device by the number of said plurality of charging devices.

5. A system in accordance with claim 4, wherein said first processor is further programmed to determine the number of said plurality of charging devices to be a number of said plurality of charging devices that are at least one of supplying current and requesting to supply current to a power storage device of the plurality of power storage devices.

6. A system in accordance with claim 4, wherein said first processor is programmed to enable the amount of current to be at least one of received from the electric power source and supplied to the first power storage device if the amount of current is equal to or greater than a predetermined minimum current threshold.

7. A system in accordance with claim 1, wherein said first processor is further programmed to determine an initial amount of current to at least one of receive from the electric power source and supply to the first power storage device that is equal to the amount of current that said second charging device is at least one of supplying, receiving, expecting to receive, and expecting to supply subtracted from a current distribution limit of an electrical distribution device.

8. A system in accordance with claim 1, wherein said second processor is further programmed to respond to the first request by transmitting data indicative of current that said second charging device is at least one of supplying, receiving, expecting to receive, and expecting to supply.

9. A charging device comprising:
a current control device configured to selectively enable current to be received from an electric power source and supplied to a power storage device;
a first processor coupled to said current control device;
a network interface configured to couple to at least a second charging device having a second processor to form a network; and
wherein said first processor is coupled to said current control device and programmed to:
transmit a first request to said second charging device to determine an amount of current that said second charging device is at least one of supplying, receiving, expecting to receive, and expecting to supply;
determine an amount of current to be at least one of received from the electric power source and supplied to the power storage device as a function of a number of charging devices within the network; and
control said current control device to enable the amount of current to be at least one of received from the electric power source and supplied to the power storage device;
wherein, in response to said first request, said first processor is further programmed to receive data from said second charging device; and
wherein said first processor is further programmed to detect an interference that occurs when said first charging device receives a second request while waiting for data to be received in response to the first request.

10. A charging device in accordance with claim 9, wherein said charging device is coupled to an electrical distribution device and is configured to receive current from the electrical distribution device and supply at least a portion of the received current to the power storage device.

11. A charging, device in accordance with claim 10, wherein said first processor is further programmed to determine the amount of current to be at least one of received from the electric power source and supplied to the power storage device by dividing a current distribution limit of the electrical distribution device by the number of charging devices within the network.

12. A charging device in accordance with claim 11, wherein said first processor is further programmed to determine the number of charging devices to be a number of charging devices within the network that are at least one of supplying current, receiving current, expecting to receive current, and expecting to supply current to a power storage device.

13. A charging device in accordance with claim 9, wherein said first processor is further programmed to determine an initial amount of current to at least one of receive from the electric power source and supply to the power storage device based on the amount of current that said second charging device is at least one of supplying, receiving, expecting to receive, and expecting to supply.

14. A method of supplying current to a plurality of power storage devices, said method comprising:
determining a number of a plurality of charging devices within a network, wherein a first charging device of the plurality of charging devices includes a first processor, and a first current control device configured to receive current from an electric power source and to supply current to a first power storage device of the power storage devices, and wherein a second charging device of the plurality of charging devices includes a second processor and second current control device configured to receive current from an electric power source and to supply current to a second power storage device of the plurality of power storage devices;
determining with the first processor an amount of current to be at least one of received from the first electric power source and supplied to the power storage device by the first charging device as a function of the number of charging devices within the network; and
controlling the first current control device to enable the amount of current to be at least one of received from the electric power source and supplied to the power storage device;
determining with the second processor an amount of current to be at least one of received from the electric power source and supplied to the second power storage device by the second charging device as a function of the number of charging devices within the network; and
controlling the second current control device to enable the amount of current to be at least one of received from the electric power source and supplied to the second power storage device;
transmitting a first request to the plurality of charging devices to determine an amount of current that each charging device is at least one of supplying, receiving, expecting to receive, and expecting to supply; and
transmitting a second request from said second charging device to said first chart charging device;
receiving the second request by said first charging device; and
detecting with said first processor of said first charging device, an interference that occurs when said first charging device receives the second request while waiting for data to be received in response to the first request.

15. A method in accordance with claim 14, wherein said determining an amount of current to be at least one of received from the electric power source and supplied to the first power storage device by the first charging device comprises dividing a current distribution limit of an electrical distribution device by the number of charging devices within the network.

16. A method in accordance with claim 14, wherein said determining a number of a plurality of charging devices within a network comprises determining a number of a plurality of charging devices within a network that are at least one of supplying current, receiving current, expecting to receive current, and expecting to supply current to a power storage device.

17. A method in accordance with claim 14, further comprising determining an initial amount of current to at least one of receive from the electric power source and supply to the first power storage device based on the amount of current that each charging device of the plurality of charging devices is at least one of supplying, receiving, expecting to receive and expecting to supply.

18. A method in accordance with claim 14, further comprising transmitting by said second processor data indicative of current that said second charging device is at least one of supplying, receiving, expecting to receive, and expecting to supply in response the first request.

* * * * *

UNITED STATES PATENT AND TRADEMARK OFFICE
CERTIFICATE OF CORRECTION

PATENT NO. : 8,332,078 B2  
APPLICATION NO. : 13/278222  
DATED : December 11, 2012  
INVENTOR(S) : Narel et al.

Page 1 of 1

It is certified that error appears in the above-identified patent and that said Letters Patent is hereby corrected as shown below:

In the Claims:

In Column 14, Line 11, in Claim 14, delete "the first electric" and insert -- the electric --, therefor.

In Column 14, Line 12, in Claim 14, delete "the power storage" and insert -- the first power storage --, therefor.

In Column 14, Line 33, in Claim 14, after "said first" delete "chart".

In Column 14, Line 36, in Claim 14, delete "detecting with" and insert -- detecting, with --, therefor.

Signed and Sealed this  
Sixteenth Day of April, 2013

Teresa Stanek Rea  
*Acting Director of the United States Patent and Trademark Office*